United States Patent
Wang

[19]

[11] Patent Number: 5,844,747
[45] Date of Patent: Dec. 1, 1998

[54] DISK DRIVE CARRIER WITH HIGH COOLING EFFICIENCY

[75] Inventor: Gang Wang, San Diego, Calif.

[73] Assignee: NCR Corporation, Dayton, Ohio

[21] Appl. No.: 872,854

[22] Filed: Jun. 11, 1997

[51] Int. Cl.⁶ .................................................. G11B 33/14
[52] U.S. Cl. ......................................................... 360/97.02
[58] Field of Search ............................. 360/97.01–97.03, 360/97.04

[56] References Cited

U.S. PATENT DOCUMENTS

| | | | |
|---|---|---|---|
| 4,636,781 | 1/1987 | Wills et al. | 361/390 |
| 4,807,072 | 2/1989 | Ono et al. | 360/105 |
| 4,903,157 | 2/1990 | Malek | 360/105 |
| 4,989,108 | 1/1991 | Chang | 360/105 |
| 5,012,371 | 4/1991 | Pollard et al. | 360/105 |
| 5,019,932 | 5/1991 | Iwata | 360/105 |
| 5,162,959 | 11/1992 | Arin et al. | 360/105 |
| 5,600,509 | 2/1997 | Kawakami | 360/97.02 |

*Primary Examiner*—Allen T. Cao
*Attorney, Agent, or Firm*—Merchant, Gould, Smith, Edell, Welter & Schmidt

[57] ABSTRACT

A disk drive carrier provides high cooling efficiency to a disk drive. The carrier connects to the disk drive and also to the module holding the carrier so that both the carrier and the module extract heat away from the disk drive and also dissipate the heat into the cooling air generated by a fan. The carrier places highly conductive material between the disk drive and the module, thus converting the carrier and the module into heatsinks for the disk drive, while allowing the carrier to slide freely in and out of the module as desired.

28 Claims, 5 Drawing Sheets

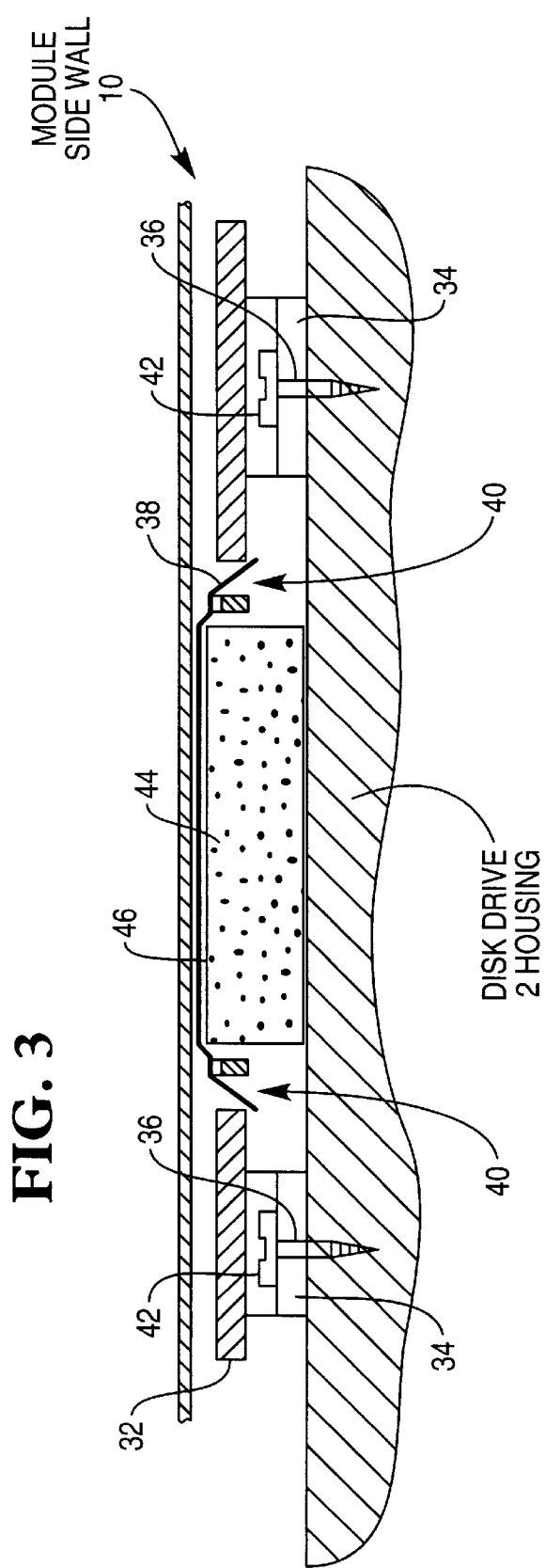

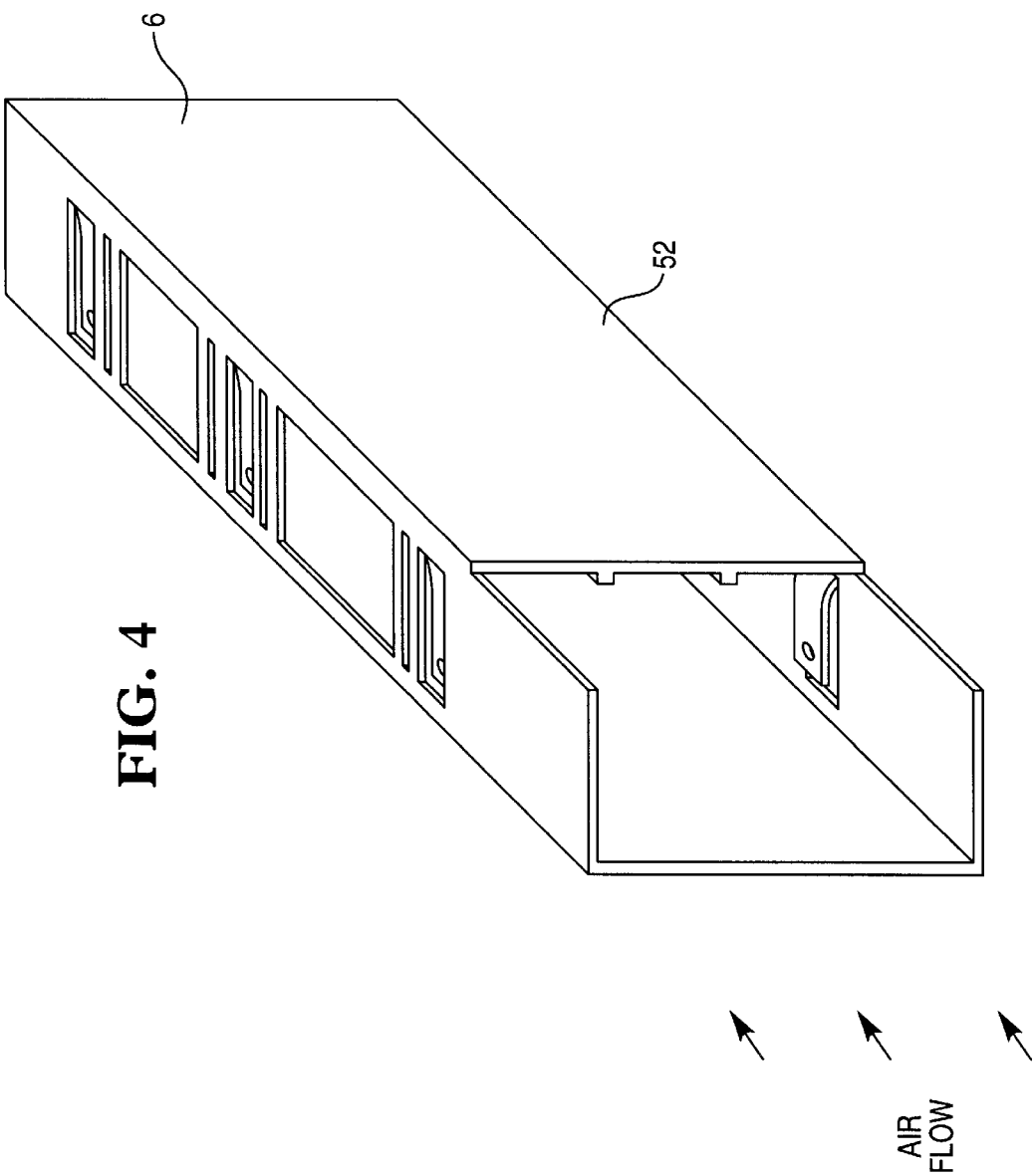

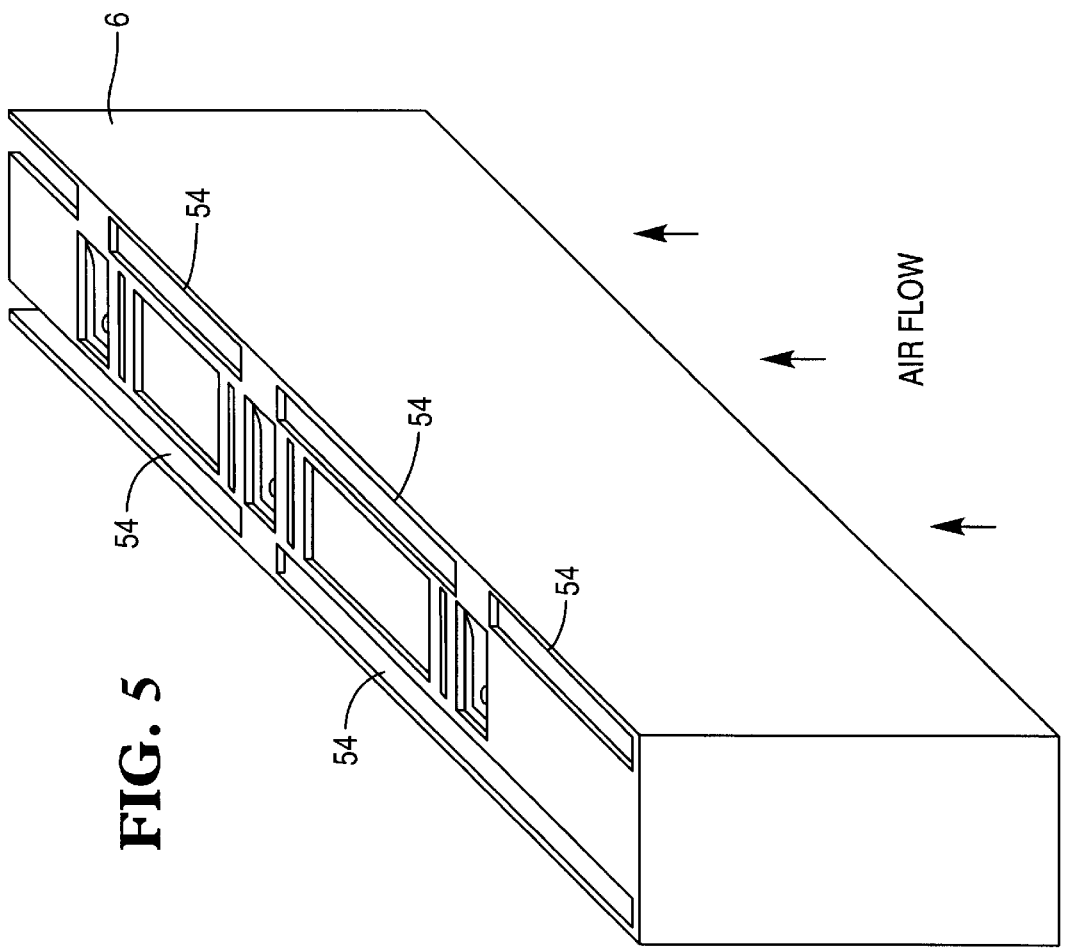

DISK DRIVE CARRIER WITH HIGH COOLING EFFICIENCY

BACKGROUND OF THE INVENTION

1. Field of Invention

The present invention relates generally to disk drive carriers, and more particularly, to a disk drive carrier for holding a disk drive inside a computer module or cabinet while providing high cooling efficiency to the disk drive.

2. Description of Related Art

As the storage capacities of disk drives increase, so does the amount of heat they dissipate. One of the major causes for disk drive failure is overheating of the electronic components and the head disk assembly (HDA). Therefore, it is very important and even essential to enhance the cooling efficiency of disk drives, especially as disk drive storage capacity increases.

Disk drive cooling is primarily accomplished by convective heat transfer provided by cooling fans. Although increasing the fan capacity will improve disk drive cooling, there are limitations on how much fan capacity can be increased. For example, fans generate acoustic noise, which increases in proportion to fan capacity, and which creates undesirable effects on computer performance.

Based on the laws that govern heat transfer, disk drive cooling efficiency can also be improved by increasing or extending the disk drive surface area. Including conventional heatsinks in disk drives will improve disk drive cooling efficiency, but at the cost of extra space, with a resultant decrease in device density and an increase in cost per unit storage capacity.

In many applications disk drives are mounted inside disk drive carriers. These carriers are in turn detachably installed into a module or a cabinet that is an integral part of a big computing system. Heat can be dissipated through the disk drive carrier by using the surface area extension of the carrier, which is in contact with the disk drives through mounting mechanisms.

Carriers are also in contact with the module or cabinet. However, traditional disk drive carriers do not dissipate much heat from the disk drives to the cabinet or module for two reasons. First, traditional disk drive cabinets or modules are typically made of plastics, which do not conduct heat well. Second, the current design of the couplings between the disk drives and the carriers and between the carriers and the chassis does not provide for good heat conduction.

SUMMARY OF THE INVENTION

To overcome the limitations in the disk drive carriers described above, and to overcome other limitations that will become apparent upon reading and understanding the present specification, the present invention discloses a disk drive carrier that provides a high degree of cooling to a disk drive mounted therein.

An object of the present invention is to provide a high degree of cooling through the surface area expansion of a disk drive carrier as well as the cabinet or module in which the carrier is placed.

Another object of the present invention is to provide a disk drive carrier that minimizes air flow resistance to the electronics and HDA.

A further object of the present invention is to provide a disk drive carrier that maximizes contact surface areas between the disk drive carrier and the disk drive.

A further object of the present invention is to provide a disk drive carrier that is able to slide in and out of its module or cabinet, rendering easy access for replacement and service.

Still another object of the present invention is to provide a disk drive carrier that maximizes contact areas between the disk drive carrier and the module or cabinet chassis so that a significant amount of thermal energy can be conducted from the disk drive to the disk drive carrier, as well as to the module or cabinet chassis, and eventually dissipate into the cooling air through convection.

Still another object of the present invention is to provide a disk drive carrier that provides traditional functionality of disk drive carriers, including:

easy handling;

shielding the electronics from being touch by hands;

ensuring a good electrical connection; and ensuring sturdy mounting of the disk drive to minimize disk drive motion and vibration.

Improvement in disk drive cooling efficiency is becoming a very important issue as disk drives dissipate more and more heat due to the ever-growing disk drive storage capacity. The disk drive carrier described herein is designed such that the heat generated within a disk drive can be effectively transferred to the carrier itself and to the chassis that houses the disk drive. As such both the disk drive carrier and the chassis are effective heatsinks which dissipate the heat extracted from the disk drive into the cooling air generated by a fan, thus improving the cooling efficiency.

BRIEF DESCRIPTION OF THE DRAWINGS

Referring to the drawings, where like reference numerals refer to like elements throughout the several views:

FIG. 3 is a drawing of the preferred embodiment of the present invention showing the physical contact between a disk drive, a disk drive carrier, and a disk drive module;

FIG. 4 is a drawing illustrating the flow of air from the front to the back of a disk drive carrier; and FIG. 5 is a drawing of a further embodiment of the present invention in which air flows from the bottom to the top of the disk drive carrier.

DETAILED DESCRIPTION OF THE PREFERRED EMBODIMENT

In the following description of the preferred embodiment, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
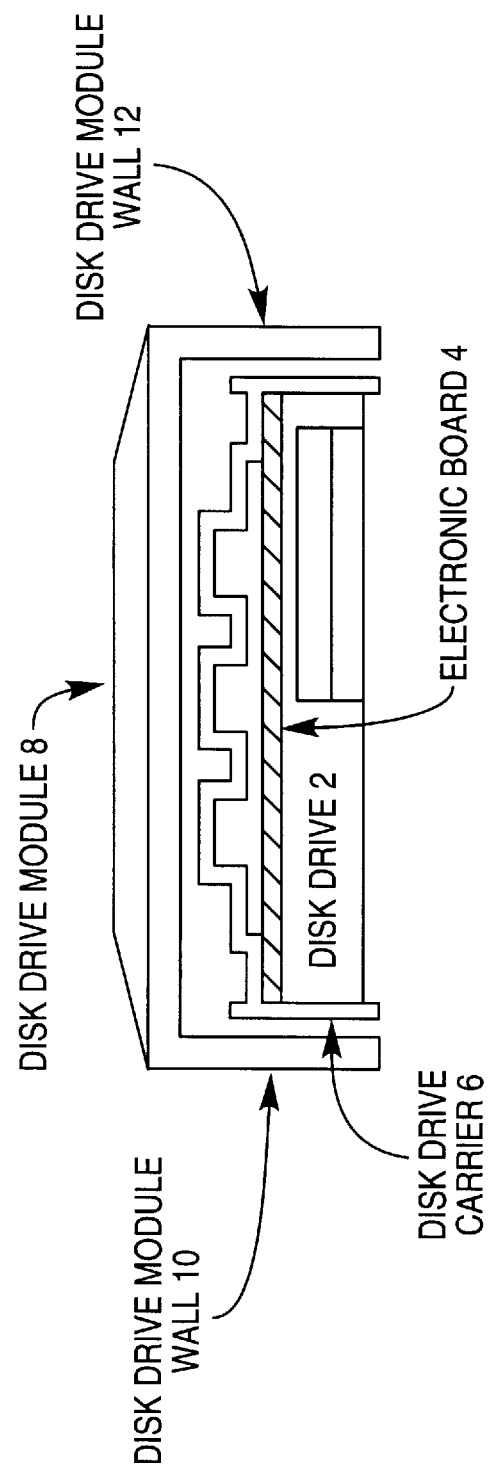
FIG. 1 is a drawing of a preferred embodiment of the disk drive carrier embodying the present invention.

FIG. 1 is a drawing of a preferred embodiment of the present invention showing a disk drive 2, including electronic board 4 which forms the top of disk drive 2, mounted inside disk drive carrier 6. Disk drive carrier 6, which is preferably made of highly conductive material such as aluminum, slides into disk drive module 8, and is mounted therein. As will be discussed in more detail below, after it is placed inside disk drive module 8, disk drive carrier 6 is held firmly in place by disk drive module walls 10 and 12. It is to be understood that in the present application, the term disk drive module is used to refer to modules, computer cabinets, or other computer components in which disk drives are stored.

Figure 2:
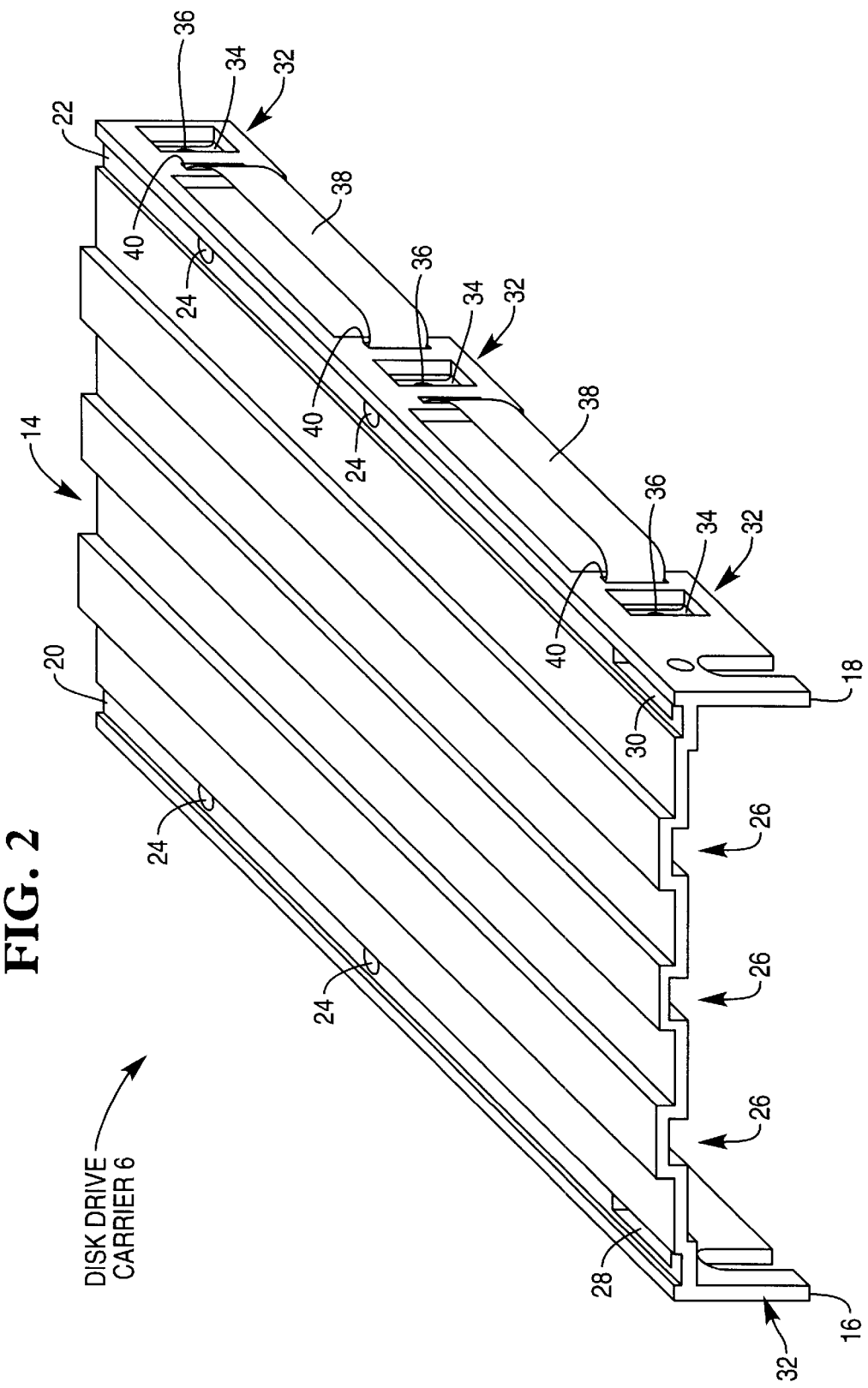
FIG. 2 is a more detailed drawing of the preferred embodiment of the present invention.

FIG. 2 is an isometric view of the disk drive carrier 6 according to a preferred embodiment. The carrier 6 is preferably symmetric, comprising a top portion 14 and two side portions 16, 18 having an overall dimension generally larger than that of disk drive 2. The top portion 14 includes two mounting strips 20, 22 along the edges, for mounting to the electronic board 4 on top of disk drive 2. Mounting strips 20 and 22 each have two mounting holes 24 corresponding to holes on the edges of the electronic board 4. Mounting strips 20 and 22 are connected together by the rest of top portion 14, formed in the shape of folded fins 26 to allow maximum exposed surface area. Top portion 14 is raised along lines 28, 30 to a level higher than mounting strips 20 and 22, to minimize the resistance to the cooling air flowing between electronic board 4 and folded fins 26.

The two side portions 16 and 18 each include three separate "mother" ear pieces 32. Each mother ear piece 32 is an extension of the top portion 14, and is bent 90 degrees. The distance between mother ear pieces 32 on opposite sides of disk drive carrier 6 is slightly less than the width of disk drive module 8, so that carrier 6 may slide freely into module 8. It will be understood by those skilled in the art that mother ear pieces 32 may take many different shapes other than shown by FIG. 2, and may even be connected to each other at their bottom edges.

Each mother ear piece 32 further includes a "daughter" ear piece 34 that is parallel to but connected on at least one side to the mother ear piece 32, and located towards the center of the carrier 6. The width between these daughter ear pieces 34 on the opposite sides of disk drive carrier 6 is the same as the width of disk drive 2. Further, holes 36 on each daughter ear piece 34 correspond to mounting holes on the sides of the disk drive 2, allowing carrier 6 to be attached to the disk drive 2 housing by six side mounting screws, one for each daughter ear piece mounting hole 36. In addition, disk drive 2 is mounted from the top to disk drive carrier 6 by four mounting screws, which will mount through the four mounting holes 24, corresponding to holes on the edges of the electronic board 4.

Thus, as can be seen from FIG. 2, in the preferred embodiment, the attachment between disk drive 2 and disk drive carrier 6 is such that all ten mounting holes on the disk drive aluminum housing are utilized—four mounting holes 24 on the edges of the electronic board 4 and six mounting holes 36 on the sides of the disk drive 2 housing. Of course, one of ordinary skill in the art will recognize that a different number of mounting holes 24 and 36 can be used to accomplish the desired mounting.

The carrier 6 also includes four thin, shallow, U-shaped metal pieces or strips 38 with both ends bent for clip-in attachment to slots 40 on the mother ear pieces 32. When the U-shaped metal pieces 38 are clipped on, the overall width of the carrier 6 between the outer edges of the U-shaped metal pieces 38 is slightly wider than the width of disk drive module 8, in which disk drive 2 is placed. This arrangement allows disk drive carrier 6 to slide in an out of the disk drive module 8, the U-shaped thin metal pieces 38 being deformed and pressed upon to conform to the width of the disk drive module 8. It will be understood by those skilled in the art that the U-shaped metal pieces 38 may take other curved forms that will provide this desired sliding function, and that there exist many other methods of attaching these metal pieces 38.

FIG. 3 is a drawing of a preferred embodiment of the present invention showing the arrangement of physical contact between the housing of disk drive 2, disk drive carrier 6, and disk drive module side wall 10. As depicted in FIG. 3, the U-shaped, thin metal piece 38 is attached to slots 40 in two adjacent mother ear pieces 32. Once in place, the spring force provided by the U-shaped, thin metal pieces 38 makes disk driver carrier 6 sturdily mounted inside disk drive module 8. Daughter ear pieces 34 extend towards disk drive 2, and provide mounting holes 36 corresponding to holes on the housing of disk drive 2 for screws 42.

Finally, the gap between the U-shaped, thin, metal pieces 38 and the disk drive 2 housing is filled with specially formulated highly conductive sponge-like interface materials 44 that can be squeezed to conform to any shape. In a preferred embodiment, this material is made from a GAP PAD [TM] made by Bergquist Co., of Minneapolis, Minn.

To further improve heat conduction between disk drive carrier 6 and disk drive module sidewall 10, thin strips of thermal interface material 46 are placed onto metal pieces 38. In a preferred embodiment, Thermal Graphite Tape 695, made by Furon Corp., New Haven, Conn., is taped onto metal pieces 38, facing module sidewall 10.

When carrier 6, disk drive 2, and disk drive module 8 are assembled as shown in FIG. 2 and FIG. 3, the thermal energy generated from disk drive 2 is effectively transferred through ten mounting screws, to disk drive carrier 6 and, in turn, is dissipated into the up coming cooling air flow from convection fans. Further, the thermal energy is transferred through the highly conductive sponge-like interface material 44—from the sides of the disk drive 2 housing to the carrier 6 as described, effectively converting the exposed surface areas of disk drive carrier 6 as well as disk drive module 8 into an extensive heatsink.

In another embodiment of the present invention, the disk drive carrier 6 will not have daughter ear pieces for contacting the disk drive 2 housing. Instead, the module side wall 10 shown in FIG. 3 will be thick enough to reach the disk drive 2 housing.

FIG. 4 is a drawing illustrating the flow of air from the front to the back of a disk drive carrier. The disk drive carrier is shown from the bottom view. A cover 52 is placed on the bottom of the disk drive carrier for protecting the disk drive. Fans are used to direct air flow from the front towards the back of the disk drive carrier, contacting the surface area of the carrier and thereby cooling the disk drive.

FIG. 5 is a drawing of a further embodiment of the present invention in which air flows from the bottom to the top of the disk drive carrier. Differently sized slots 54 are provided along the edges of both top and bottom sides of the disk drive carrier. Air is then allowed to flow from the bottom side, through and on either side of the carrier, and to the top side.

This concludes the description of the preferred embodiment of the invention. The following paragraphs describe some alternative embodiments of the present invention.

In one alternative embodiment, pin fins are used on the top of the carrier instead of folded fins to improve cooling efficiency. Such heat conductive pin fins conduct heat away from the disk drive carrier, transferring it to the air flowing above the carrier. Other types of fins for achieving cooling by increasing surface area can also be used, as will be recognized by those skilled in the art.

In another alternative embodiment, slits are used on the top of the carrier instead of folded fins to allow heat to pass through and over the disk drive carrier. The configuration and size of such slits can take many configurations, as will be recognized by those skilled in the art.

In summary, the present invention provides high efficiency cooling through a disk drive carrier that effectively extends the surface area of the disk drive to include that of the disk drive carrier, and also the surface area of the disk drive module or cabinet.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A disk drive carrier that holds a disk drive inside a disk drive module, comprising:
   (a) a top portion made from heat-conductive material, for covering the disk drive and having at least a first mounting hole therethrough to accommodate a first mounting means for mounting the disk drive to the top portion;
   (b) a first side portion made from said heat-conductive material, attached to the top portion, forming approximately a ninety degree angle therewith, said first side portion having at least a second mounting hole therethrough to accommodate a second mounting means for mounting the disk drive to the first side portion; and
   (c) a first highly conductive interface member positioned between said disk drive and a first side wall of said disk drive module, said first highly conductive interface member conforming to the space between said disk drive and said first side wall of said disk drive module to transfer thermal energy from said disk drive to said disk drive module.

2. The disk drive carrier of claim 1, wherein the first side portion further comprises a first ear piece.

3. The disk drive carrier of claim 2, wherein the first ear piece comprises a first mother ear piece and a first daughter ear piece, the first daughter ear piece extending towards the center of the disk drive from the first mother ear piece.

4. The disk drive carrier of claim 3, wherein the second mounting hole is in the first daughter ear piece.

5. The disk drive carrier of claim 4, further comprising:
   (d) a second side portion positioned opposite the first side portion, made from said heat-conductive material, attached to the top portion and forming approximately a ninety degree angle therewith, said second side portion having at least a third mounting hole therethrough to accommodate a third mounting means for mounting the disk drive to the second side portion, wherein the second side portion further comprises a second ear piece comprising a second mother ear piece and a second daughter ear piece, the second daughter ear piece extending towards the center of the top portion from the second mother ear piece; and
   (e) a second highly conductive interface member positioned between said disk drive and a second side wall of said disk drive module, said second highly conductive interface member conforming to the space between said disk drive and said second side wall of said disk drive module to transfer thermal energy from said disk drive to said disk drive module.

6. The disk drive carrier of claim 5, wherein the first and second daughter ear pieces extend towards the center of the disk drive so as to touch the disk drive on opposite sides.

7. The disk drive carrier of claim 1, wherein the top portion comprises an extended surface area.

8. The disk drive carrier of claim 1, wherein the extended surface area includes fins.

9. The disk drive carrier of claim 8, further comprising:
   a third side portion positioned adjacent the first side portion, made from said heat-conductive material, attached to the top portion and forming approximately a ninety degree angle therewith, said third side portion having at least a first slot therethrough;
   wherein the first side portion contains at least a second slot therethrough;
   a first metal member having a substantially straight portion and two substantially curved ends, the two substantially curved ends being adapted to fit inside said first slot and said second slot.

10. The disk drive carrier of claim 9, further wherein the first highly conductive interface member is positioned between the first metal member and the disk drive.

11. The disk drive carrier of claim 10, wherein the first highly conductive interface member is sponge-like.

12. The disk drive carrier of claim 11, wherein the combination of the metal member and the first highly conductive interface member conform to a width of the disk drive module when the disk drive carrier is placed inside the disk drive module.

13. The disk drive carrier of claim 7, wherein the extended surface area includes a plurality of apertures for allowing heat conduction.

14. A disk drive carrier comprising:
   (a) an upper plate made of heat-conductive material;
   (b) a first side plate made of heat-conductive material and a second side plate made of heat-conductive material, said first and second side plates being connected to the upper plate at approximately a ninety-degree angle and being placed in facing relationship with each other, said first and second side plates each comprising at least two adjacent ear pieces, each ear piece having a slot; and
   (c) a first and second substantially U-shaped strip of heat-conductive material, each having a first end and a second end, said first U-shaped strip coupling the at least two adjacent ear pieces of the first side plate by passing at said first and second ends through the slot of the at least two adjacent ear pieces of the first side plate, said second U-shaped strip coupling the at least two adjacent ear pieces of the second side plate by passing at said first and second ends through the slots of the at least two adjacent ear pieces of the second side plate.

15. The disk drive carrier of claim 14, further comprising:
   (d) a layer of sponge-like heat-conductive material at least partially covering an inner side of said first and second substantially U-shaped strips of heat-conductive material.

16. The disk drive carrier of claim 15, wherein the sponge-like heat-conductive material is a very good conductor of heat.

17. The disk drive carrier of claim 16, wherein each ear piece comprises a daughter portion extending towards the center of the disk drive carrier and containing an aperture for a mounting means.

18. The disk drive carrier of claim 17, wherein the upper plate is shaped to include an extended surface area.

19. The disk drive carrier of claim 18, wherein the extended surface area includes fins.

20. The disk drive of claim 18, wherein the upper plate includes a first and second mounting strip having holes therein for mounting the disk drive, said first and second mounting strips being located proximate to the first side plate and the second side plate.

21. The disk drive carrier of claim 18, wherein the extended surface area includes a plurality of apertures for allowing heat conduction.

22. A disk drive carrier comprising:
   (a) an upper heat conductive plate having an expanded surface area;
   (b) a first side heat conductive plate and a second side heat conductive plate, said first and second side heat conductive plates being connected to the upper heat conductive plate at approximately a ninety-degree angle and being placed in facing relationship with each other, said first and second side heat conductive plates each having at least two adjacent ear pieces, each ear piece having at least one mounting hole for mounting the disk drive, and each ear piece having at least one vertical slot; and
   (c) a first and second substantially U-shaped strip of heat-conductive material, each having a first end and a second end, said first U-shaped strip coupling the adjacent ear pieces of the first side heat conductive plate by passing at said first and second ends through the slots of the adjacent ear pieces of the first side heat conductive plate, said second U-shaped strip coupling the adjacent ear pieces of the second side heat conductive plate by passing at said first and second ends through the slots of the adjacent ear pieces of the second side heat conductive plate.

23. The disk drive carrier of claim 22, wherein the upper heat conductive plate comprises a center portion and two thin outer portions, the center portion being higher than the two thin outer portions.

24. The disk drive carrier of claim 23, wherein said two thin outer portions each contain at least two mounting holes.

25. The disk drive carrier of claim 22, wherein said expanded surface area of said upper heat conductive plate comprises folded fins.

26. The disk drive carrier of claim 22, wherein said expanded surface area of said upper heat conductive plate comprises pin fins.

27. The disk drive carrier of claim 22, wherein the first side heat conductive plate and the second side heat conductive plate include slots along the edges thereof, allowing air to pass through the disk drive carrier.

28. The disk drive carrier of claim 22, wherein said expanded surface area of said upper heat conductive plate includes a plurality of apertures for allowing heat conduction.

\* \* \* \* \*